United States Patent [19]

Valkestijn et al.

[11] Patent Number: 4,572,994
[45] Date of Patent: Feb. 25, 1986

[54] CIRCUIT ARRANGEMENT FOR A PICTURE DISPLAY DEVICE FOR GENERATING A SAWTOOTH LINE DEFLECTION CURRENT

[75] Inventors: Leonardus A. A. Valkestijn; Christianus H. J. Bergmans, both of Eindhoven, Netherlands

[73] Assignee: U.S. Philips Corporation, New York, N.Y.

[21] Appl. No.: 502,788

[22] Filed: Jun. 9, 1983

[30] Foreign Application Priority Data

Jun. 21, 1982 [NL] Netherlands ............... 8202499

[51] Int. Cl.⁴ ............................................. H01J 29/70
[52] U.S. Cl. .................................... 315/411; 315/408; 315/399
[58] Field of Search .............. 315/411, 408, 406, 399, 315/403

Primary Examiner—Theodore M. Blum
Assistant Examiner—Gregory C. Issing
Attorney, Agent, or Firm—Thomas A. Briody; William J. Streeter

[57] ABSTRACT

A circuit arrangement for a picture display device for generating a sawtooth line deflection current. The arrangement comprises a power supply transformer having a primary winding and a secondary winding. One end of the primary winding is connected to a terminal of a supply voltage source and the other end to a controllable supply switch whose other side is connected to the other terminal of the source. The secondary winding is connected in series with a line deflection coil, a trace capacitor, and a deflection switch. A retrace capacitor is connected to the line deflection coil. During the retrace period the line deflection coil, the trace and the retrace capacitors are part of a resonant network the elements of which determine the duration of the retrace period. The secondary winding of the power supply transformer, the line deflection coil, the trace capacitor and the deflection switch are part of a loop to which a trace rectifier and an inductance, whose other end is connected to a voltage terminal, are connected, while a primary capacitor is coupled to the primary winding for partly determining the retrace period.

9 Claims, 2 Drawing Figures

4,572,994

CIRCUIT ARRANGEMENT FOR A PICTURE DISPLAY DEVICE FOR GENERATING A SAWTOOTH LINE DEFLECTION CURRENT

BACKGROUND OF THE INVENTION

The invention relates to a circuit arrangement for a picture display device for generating a sawtooth line deflection current having a trace and a retrace through a line deflection coil, comprising a power supply transformer having a primary winding, one end of which is connected to a terminal of a supply voltage source and the other end to a controllable supply switch which is connected to the other terminal of said source and having a secondary winding to which there are coupled the series arrangement of the line deflection coil and a trace capacitor and also a deflection switch which is also controllable, and a retrace capacitor, the deflection switch being conductive in operation during the trace period and cut off during the retrace period, while the supply switch is conductive during at least a portion of the trace period and cut off during the retrace period, the line deflection coil, the trace and retrace capacitors forming part, in the retrace period, of a resonant network the elements of which determine the duration of the retrace period.

A circuit arrangement of this type is disclosed in the European Patent Application 33,678. By means of this known circuit arrangement all the supply voltages for the different portions of the picture display device, including the line deflection circuit, one be generated. If necessary, the generated voltages and the amplitude of the line deflection current can be kept substantially constant by controlling the conduction time of the supply switch. The prior art circuit arrangement also comprises a third switch arranged in series with the secondary winding of the transformer which is conductive during the period of time the supply switch is cut off and cut off during the period of time the supply switch is conductive. This means that supply energy is stored in the transformer during the time the supply switch conducts and that during the time this switch is cut off this energy is applied by the secondary winding of the transformer to the resonant network to replenish energy losses therein.

SUMMARY OF THE INVENTION

It is an object of the invention to provide a circuit arrangement of the above-described type wherein the supply energy for replenishing the losses in the line deflection circuit is not stored in the power transformer but is directly withdrawn from the supply voltage source, which renders it possible to reduce the dimensions and consequently the price of the transformer considerably. According to the invention, the circuit arrangement is therefor characterized in that the secondary winding of the power supply transformer, the line deflection coil, the trace capacitor and the deflection switch form part of a loop to which a trace rectifier and an inductance, whose other end is connected to a voltage terminal, are connected, while a primary capacitor is coupled to the primary winding for partly determining the retrace period, the supply switch being conductive in operation during the entire trace period.

It should be noted that in an embodiment of the prior art circuit arrangement the third switch is provided by a diode having a long recovery time. This diode must not be mistaken for a similar element in a trace rectifier for the reason that the diode does not conduct during the trace period and generates no voltage then.

In the circuit arrangement in accordance with the invention the trace rectifier may comprise the series arrangement of a diode and a smoothing capacitor, this arrangement being arranged in parallel with the secondary winding of the power supply transformer. In operation the voltage terminal may carry voltage with respect to the junction of the diode and the smoothing capacitor, which voltage may vary at the field frequency for correcting the raster distortion.

A preferred embodiment of the circuit arrangement in accordance with the invention may be characterized by a variation of the conduction period of the supply switch and by a feedback of the voltage generated by the trace rectifier for controlling the said conduction period in dependence on this voltage.

BRIEF DESCRIPTION OF THE DRAWING

The invention will now be described in greater detail by way of example with reference to the accompanying drawing. Herein.

DESCRIPTION OF THE PREFERRED EMBODIMENTS

Figure 1:
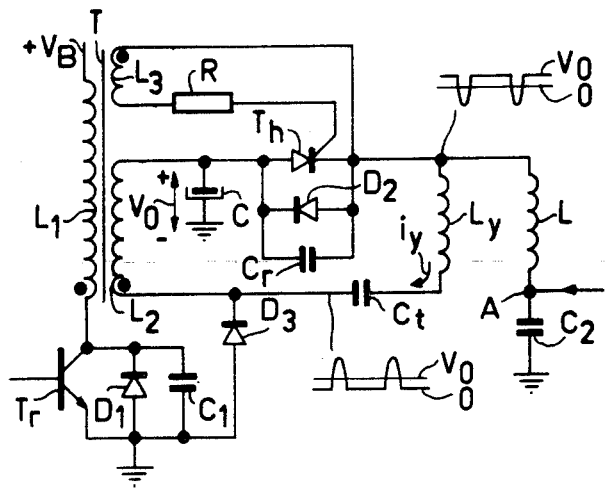
FIG. 1 shows a first embodiment.

In FIG. 1, $L_y$ denotes a line deflection coil for the electromagnetic deflection in the horizontal direction of one or more electron beams generated in a picture display tube, not shown. A trace capacitor $C_t$ and a thyristor Th are arranged in series with coil $L_y$. A diode $D_2$ is arranged in parallel with thyristor Th with the opposite conductivity direction thereto. The network formed by elements $C_t$, $L_y$, Th and $D_2$ is connected to a winding $L_2$ and forms therewith a loop which also comprises a retrace capacitor $C_r$, which is arranged in parallel with thyristor Th and diode $D_2$. Winding $L_2$ is a secondary winding of a transformer T, a primary winding $L_1$ of which has one end connected to the positive terminal of a supply voltage source $V_B$ and its other end to the collector of an npn-switching transistor Tr and to the cathode of a diode $D_1$. The emitter of transmitter Tr and the anode of diode $D_1$ are connected to the negative terminal of source $V_B$ and a capacitor $C_1$ is arranged in parallel with transistor Tr and diode $D_1$.

A number of further secondary windings are wound on the core of transformer T. FIG. 1 shows one of these windings, more specifically winding $L_3$, which has one end connected to the cathode of thyristor Th and the other end to the cathode gate thereof. The winding senses of windings $L_1$, $L_2$ and $L_3$ are indicated in customary manner by dots. The circuit also comprises a diode $D_3$, whose cathode is connected to one end of winding $L_2$ and a smoothing capacitor C connected to the other end of winding $L_2$, and also an inductance L connected to the junction of the components $L_y$, Th, $D_2$, $C_r$ and $L_3$ and whose other side is connected to a voltage terminal A. The anode of diode $D_3$ and that terminal of capacitor C which is not connected to winding $L_2$ are interconnected and connected to a point of fixed potential, to which point also a capacitor $C_2$ is connected, whose other side is connected to terminal A. The said fixed potential may be the ground potential and can be d.c. isolated from the negative terminal of source $V_B$ by means of transformer T. If voltage $V_B$ is derived from the electric power mains by means of rectification, then the portions of the picture display device, for example a television receiver of which the circuit arrangement shown in FIG. 1 forms part, which are supplied with supply energy by the different secondary windings of transformer T are thereby isolated from mains. The arrangement of FIG. 1 does not have mains isolation.

The circuit arrangement shown in FIG. 1 further comprises elements which have not been shown for the sake of simplicity. A linearity control device and the control means for transistor Tr are such elements, which are known per se. The voltage which can be applied to terminal A is first left out of consideration, so that terminal A may be assumed as being connected to ground. During operation, when the steady state has been reached, a line deflection current $i_y$ flows through coil $L_y$. During the retrace period the supply switch formed by transistor Tr and diode $D_1$ does not conduct while the deflection switch formed by thyristor Th and diode $D_2$ is also non-conductive. The inductances and the capacitances of the circuit arrangement form a resonant network having a resonant frequency determined by these elements. The capacitors $C_r$ and $C_1$ are then arranged in series via transformer T. The voltage across windings $L_1$ and $L_2$ varies in accordance with a cosine function having this frequency, while current $i_y$ varies sinusoidally. At the end of the trace period transistor Tr was conductive, so that the voltage at the collector was substantially zero. This voltage increases during the retrace period. Because of the winding sense of windings $L_1$ and $L_2$ the voltage at the cathode of diode $D_3$ also increases, the diode remaining in the cut-off state, while the voltage between the cathode gate and the cathode of thyristor Th decreases and keeps the thyristor in the non-conducting state.

At the centre instant of the retrace period the voltage at the cathode of diode $D_3$ reaches a maximum, while current $i_y$ becomes zero and thereafter reverses its direction. At the instant at which this voltage and the voltage at the collector of transistor Tr become zero again diodes $D_1$ and $D_3$ become conductive. At the same instant the voltage across switch Th, $D_2$ assumes the same value as prior to the retrace, i.e. substantially zero, causing diode $D_2$ to become conductive. This is the commencement of the trace.

During the trace period a voltage $V_B$ is present across winding $L_1$. Constant voltages are present across windings $L_2$ and $L_3$. Voltage $V_B$ is then assumed to be constant. At that end of the winding which carries a dot the voltage is negative relative to the other end. If the capacitance of capacitor $C_t$ is assumed to be infinitely large then coil $L_y$ is connected to a constant voltage. So current $i_y$ varies linearly through coil $L_y$, diode $D_2$, winding $L_2$ and capacitor $C_t$. Halfway through the trace period current $i_y$ reverse its direction and flows through thyristor Th, whose control voltage has the suitable polarity. At the same instant also the current through winding $L_1$ reverses its direction. Prior to this instant this current flows through diode $D_1$ to the positive terminal of source $V_B$, after this instant it flows from the said terminal through transistor Tr to ground. For this purpose transistor Tr is timely supplied with a positive control pulse at its base.

In the foregoing the circuit arrangement is assumed to be a lossless circuit. Switch Tr, $D_1$ clamps the voltage at the collector of transistor Tr on the ground potential. In similar manner the voltage at the cathode of diode $D_3$ is clamped by it at the same potential. A voltage $V_o$ which is equal to voltage $V_B$ multiplied by the transformer ratio between windings $L_1$ and $L_2$ is present across capacitor C. In a lossless circuit diode $D_3$ is currentless. FIG. 1 shows the voltage at the cathode thereof. The average value of this voltage is equal to $V_o$. At the junction of elements Th, $D_2$, Cr, $L_3$, $L_y$ and L the voltage is $V_o$ during the trace period. As the average value of this voltage is equal to the voltage at terminal A, that is to say equal to zero, the retrace pulses at the said point are directed negatively. This voltage is also shown in FIG 1. The average value of the voltage at the junction of coil $L_y$ and capacitor $C_t$ is also zero and the voltage across this capacitor is equal to $-V_o$. From this it can be seen that the voltage at the above-mentioned junction is equal to $-V_o$ during the trace period and consequently that the voltage across coil $L_y$ is equal to $2V_o$ during the same period.

The retrace is initiated at the instant at which transistor Tr is cut-off in response to a negatively-directed control signal supplied to its base, as a result of which also thyristor Th and diode $D_3$ are cut-off.

In practice the capacitance of capacitor $C_t$ is given a finite value, so that the voltage across coil $L_y$ does not remain constant during the trace period. In this manner what is commonly referred to as the S-correction is obtained for the deflection current. Terminal A carries a voltage which in general is not zero, so that the average value of the voltage at the junction of coil $L_y$ and inductance L is also non-zero and is equal to the voltage at terminal A, on the condition that this voltage is constant or varies only slowly. If this voltage is positive, then the amplitude of the retrace pulse at the said junction is smaller than in the case this voltage is zero, and consequently also the amplitude of current $i_y$ is smaller.

By adjusting the d.c. component of the voltage at terminal A the said amplitude and consequently the width of the displayed picture can be adjusted. The voltage at terminal A may also comprise a field-frequency component for correcting raster distortion. If this distortion is a pin-cushion distortion then the said component will be in the form of a parabola having a minimum half-way through the field trace period. This results, as desired, in a larger amplitude for current $i_y$ halfway through the field trace period than at the beginning and at the end of this period.

Without losses the same amount of current returns to source $V_B$ as supplied by it, so that the total energy consumption of the circuit arrangement is indeed zero. Actually, because of the losses, more current is withdrawn from $V_B$ than is returned to it. So, a d.c. component flows through the winding $L_1$, which means that the sawtooth current through this winding reverses its direction prior to the centre instant of the trace period. In view of the winding sense of windings $L_1$ and $L_2$ there flows through winding $L_2$ also a d.c. component which cannot flow through capacitor $C_t$ and which finds a way through diode $D_3$ for recharging capacitor C. This current, which can only flow during the trace period, replenishes the losses in the deflection circuit. Diode $D_3$ and capacitor C form a trace rectifying circuit together with winding $L_2$. For that purpose winding $L_2$ has a suitable winding sense, while diode $D_3$ has a suitable conduction direction. It should be noted that the choice of the trace rectification causes the charging current of capacitor C, which supplies supply energy to the deflection circuit, flow during the conduction period of the supply switch and that consequently this supply energy will not be stored in transformer T. So the supply energy is directly withdrawn from source $V_B$. This has the advantageous result that the transformer may have a relatively small core and have less energy loss.

A further advantage of the circuit arrangement is the fact that the voltages at the ends of the deflection coil have the same absolute values but opposite signs, so that the centre point of the coil has the ground potential. The capacitive radiation of the coil to other portions of the picture display device is consequently very small. This holds for the case in which no correction voltage for the pin-cushion distortion is applied to point A. In the event that this correction is indeed used, a very small, slow, i.e. field-frequency shift of the virtual earth point is effected. Furthermore, it has been found that the field-frequency variation has little influence on the primary side of the circuit and consequently also on those portions of the circuit which are in connection with the other secondary windings of the transformer. The reason thereof is the fact that the deflection coil may be considered as having two substantially equal halves, one of which is in parallel with winding $L_2$, as a result of which the internal impedance of the primary side is low. For a high-voltage generator provided with a secondary winding a low internal impedance, namely lower than 1 M $\Omega$ has been measured, while a field-frequency variation of only 2% occurred at a parabola voltage having an amplitude of 20 V and a trace voltage of 150 V, which means a value of 75 V for voltage $V_o$ and an amplitude of approximately 600 V for the retrace pulses at the cathode of diode $D_3$.

Figure 2:
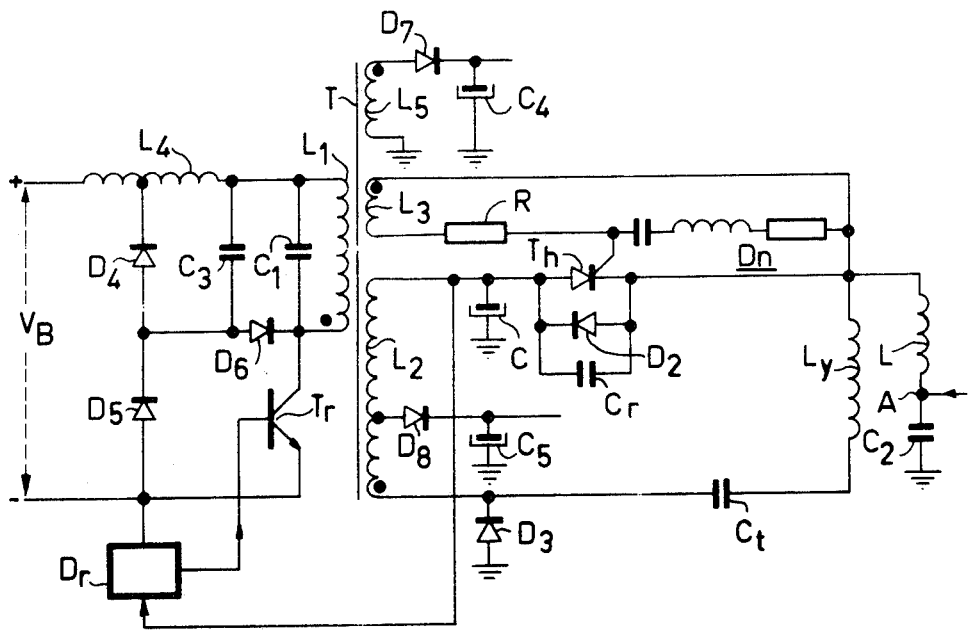
FIG. 2 shows a second embodiment of the circuit arrangement in accordance with the invention.

FIG. 2 shows a circuit arrangement which is suitable for use with a non-constant supply voltage $V_B$. In FIG. 2 the deflection circuit is substantially the same as in FIG. 1 while the supply portion at the primary side is substantially the same as that described in the publication "Philips, Electronic components and materials: Technical note 006", published in 1981. It comprises the series arrangement of two diodes $D_4$ and $D_5$. The cathode of diode $D_4$ is connected to a tap of an inductance $L_4$ an end of which is connected to the positive terminal of source $V_B$. The anode of diode $D_4$ and the cathode of diode $D_5$ are connected to the anode of a further diode $D_6$ and to a capacitor $C_3$. The other side of capacitor $C_3$ is connected to the other end of inductance $L_4$ and to winding $L_1$. The cathode of diode $D_6$ is connected to the other end of winding $L_1$ and to the collector of transistor Tr. Capacitor $C_1$ is in parallel with winding $L_1$ and the emitter of transistor Tr and also the anode of diode $D_5$ are connected to the negative terminal of source $V_B$.

FIG. 2 shows a secondary winding $L_5$ of transformer T, one end of which is connected to ground, while the other end is connected to a rectifier $D_7$. The winding sense of winding $L_5$ and the conduction direction of rectifier $D_7$ are chosen to be such that the supply voltage generated across a smoothing capacitor $C_4$ is positive, rectifier $D_7$ being conductive in the retrace period. A d.c. isolation from mains is effected by means of transformer T. Voltage $V_o$ is fed-back to a driver stage Dr which applies line frequency switching pulses to the base of transistor Tr via an isolation transformer, not shown. This results in the conduction period of transistor Tr being controlled in known manner in dependence on voltage $V_o$. This control results in the voltage across capacitor $C_3$ and also the voltages across capacitors C and $C_4$ being kept substantially constant. It is, however, a condition that transistor Tr, which is non-conducting during the retrace period, conducts without fail at the instant during the trace period when the current through winding $L_1$ reverses its direction. An analysis of the prior art circuit at the primary side of transformer T shows that the voltage across winding $L_1$ is substantially equal during the entire trace period to the voltage across capacitor $C_3$ because of the fact that either diode $D_6$ conducts or transistor Tr and diode $D_5$ conduct, so that the voltage across winding $L_2$ is substantially constant during the trace period, also in the case of FIG. 2. Consequently, capacitor $C_3$ is the supply voltage source for the circuit. This also holds for the event in which the capacitance of capacitor $C_3$ is not infinitely large, causing a line frequency variation of the voltage across it to take place. Such a variation may be desirable in certain circumstances.

A resistor R for setting the control current is included in the control lead of thyristor Th. In addition, between the cathode and the control electrode there is arranged a delay network Dn formed by, for example, the series network of a capacitor, a coil and a resistor and which provides a delay of the turn-on instant of thyristor Th relative to the turn-on instant of transistor Tr. This measure is a safety measure for the case that the retrace pulse at the primary side were shorter than the retrace pulse at the secondary side, causing thyristor Th to become conductive before the end of the secondary trace pulse, which would be harmful to the thyristor. This effect may, for example, occur if the lead to coil $L_y$ is interrupted, which results in a decrease in the tuning frequency. The control of thyristor Th may be effected in a manner different from FIG. 1 and 2, namely by means of control pulses produced by driver stage Dr. Thyristor Th experiences, namely, no influence of the pulse duration modulation of transistor Tr. In view of the different turn-off periods of the two switches the control pulses must be adapted. This is not necessary if transistor Tr is replaced by a switching element which can be rapidly turned-off, for example a thyristor (a so-called GTO=gate turn off device) or if thyristor Th is replaced by a transistor which is similar to transistor Tr.

It should be noted that the voltage $V_o$ across capacitor C may also serve as a supply voltage for picture display device portions other than the line deflection circuit. It is also possible to generate other supply voltages by means of winding $L_2$. FIG. 2 shows a rectifier $D_8$, which is connected to a tap of winding $L_2$ and generates a d.c. voltage across a smoothing capacitor $C_5$. The conductivity direction of rectifier $D_8$ has been chosen such that it operates as a fly-back rectifier. So the supply energy obtained is obtained partly from capacitor C and consequently directly from source $V_B$ and for the other part from transformer T.

It will be obvious that the deflection portion in FIGS. 1 and 2 may be constructed differently. Elements $L_y$ and $C_t$ may, for example, be interchanged, in which case inductance L is connected to the junction between capacitor C and switch Th, $D_2$, while capacitor $C_r$ may be arranged between the said junction and ground. The latter situation is also possible for the situation shown in FIGS. 1 and 2. When the components $L_y$ and $C_t$ are interchanged then in accordance with a further variant capacitor $C_r$ may be provided between the junction of these elements and ground. It will be evident to a person skilled in the art that the place in the deflection portion of the arrangement which is at ground potential is of no importance for the invention. The end of winding $L_2$, for example, may be chosen to this end.

What is claimed is

1. A circuit arrangement including a line deflection coil for a picture display device for generating a deflection current having a trace and a retrace through said line deflection coil comprising a controllable supply switch, a power supply transformer having a primary winding and a secondary winding, one end of the primary winding connected to a terminal of a supply voltage source and the other end to said controllable supply switch which is in turn connected to the other terminal of said source, a trace capacitor and a deflection switch connected in series with the secondary winding of said transformer and said line deflection coil to form a loop, a retrace capacitor connected in parallel with said deflection switch, the deflection switch being conductive during the trace period and cut off during the retrace period, the supply switch being conductive during at least a portion of the trace period and cut off during the retrace period, the line deflection coil, the trace and retrace capacitors forming part, during the retrace period, of a resonant network the elements of which determine the duration of the retrace period, a trace rectifier and an inductance connected to said loop, the other end of said inductance connected to a voltage terminal, and a primary capacitor coupled to the primary winding of said transformer for partly determining the duration of the retrace period.

2. A circuit arrangement as claimed in claim 1, wherein the trace rectifier comprises the series arrangement of a diode and a smoothing capacitor, this arrangement being in parallel with the secondary winding of the power transformer.

3. A circuit arrangement as claimed in claim 2, wherein in operation the voltage terminal carries a voltage different from the voltage at the junction of the diode and the smoothing capacitor.

4. A circuit arrangement as claimed in claim 3, wherein the voltage at the voltage terminal varies at the field frequency for correcting the raster distortion.

5. A circuit arrangement as claimed in claim 1, wherein a delay element is included in the control lead of the deflection switch.

6. A circuit arrangement as claimed in claim 1, wherein the power supply transformer has a second secondary winding and said second secondary winding of the supply transformer is connected to the control lead of the deflection switch.

7. A circuit arrangement as claimed in claim 1, wherein a retrace rectifier is connected to the secondary winding of the power supply transformer for generating a supply voltage.

8. A circuit arrangement as claimed in claim 1, wherein further secondary windings are wound on the power supply transformer for generating further supply voltages.

9. A circuit arrangement as claimed in any of the preceding Claims having a feedback of the voltage generated by the trace rectifier for controlling the said conduction period in dependence on said voltage.

* * * * *